United States Patent [19]

Nalepa

[11] Patent Number: 5,166,299
[45] Date of Patent: Nov. 24, 1992

[54] POLYURETHANES COMPRISING THE REACTION PRODUCT OF AN ISOCYANATE PREPOLYMER AND ISOMERS OF DI(METHYLTHIO)-DIAMINOTOLUENE

[75] Inventor: Christopher J. Nalepa, Baton Rouge, La.

[73] Assignee: Ethyl Corporation, Richmond, Va.

[21] Appl. No.: 756,577

[22] Filed: Sep. 9, 1991

[51] Int. Cl.$^5$ ............... C08G 18/10; C08G 18/32; C08G 18/76
[52] U.S. Cl. .................................. 528/64; 528/79
[58] Field of Search ....................... 528/64, 79

[56] References Cited

U.S. PATENT DOCUMENTS

| | | | |
|---|---|---|---|
| 4,284,761 | 8/1981 | Arendt et al. | 528/65 |
| 4,595,742 | 6/1986 | Nalepa et al. | 528/64 |
| 4,631,298 | 12/1986 | Presswood | 528/76 |
| 4,786,656 | 11/1988 | Presswood et al. | 528/85 |
| 4,975,515 | 12/1990 | Nalepa et al. | 528/68 |
| 5,041,668 | 8/1991 | Nalepa et al. | 564/330 |

OTHER PUBLICATIONS

*Hawley's Condensed Chemical Dictionary*, Eleventh Edition; 1987; p. 1163.

*Primary Examiner*—John Kight, III
*Assistant Examiner*—Rabon Sergent
*Attorney, Agent, or Firm*—Richard J. Hammond

[57] ABSTRACT

Novel polyurethane-ureas having superior high temperature performance are prepared by reacting an isomeric mixture of 3,5-di(methylthio)-2,6-diaminotoluene and 3,5-di(methylthio)-2,4-diaminotoluene with an alkyl-substituted aromatic diisocyanate prepolymer having a free —NCO content of 0.1–20% by weight, produced by the reaction of a mixture of 2,4- and alkyl-substituted 2,6-aryl diisocyanates with a polyether glycol. The polyurethane prepolymers have a free —NCO content of 2–10% by weight and contain from about 3 to about 20 weight percent of the polyether. These elastomers have good dynamic properties, such as resilience, that make them attractive as roller materials.

9 Claims, No Drawings

POLYURETHANES COMPRISING THE REACTION PRODUCT OF AN ISOCYANATE PREPOLYMER AND ISOMERS OF DI(METHYLTHIO)-DIAMINOTOLUENE

FIELD OF INVENTION

This invention relates to urethane-urea copolymers and more particularly to polyurethane-ureas having improved flexibility and resilience.

BACKGROUND

It is known that polyurethane-ureas having good-to-poor properties can be prepared by reacting isocyanate prepolymers with diamine chain extenders and that the properties obtained are at least partly dependent on the particular prepolymer/chain extender combination used in their preparation. A disadvantage of known polyurethane-ureas is that even those which have otherwise satisfactory properties are too hard to be useful in applications where resilience and flexibility are required. In attempts to reduce the hardness, prepolymers of lesser isocyanate content (greater amounts of polyol in the prepolymer) may be used. However, processing is difficult (high temperatures are required to reduce the viscosity of the prepolymer) making this a commercially unattractive option for many urethane-urea users.

An object of the present invention is to provide polyurethane-ureas having improved dynamic properties making them useful in forming coatings, rollers, sheets, and the like.

A further object of the present invention is to provide processes for preparing polyurethane-ureas of enhanced load bearing capability while maintaining polymer hardness and flexibility.

These and other objects are attained by reacting an aromatic diamine with an aromatic diisocyanate prepolymer having a free —NCO content of 0.1-20% by weight the prepolymers are produced by reacting a mixture of from about 65% to about 35% by weight of a alkyl-substituted 2,4-aryl diisocyanate and from about 35% to about 65% by weight of a alkyl-substituted 2,6-aryl diisocyanate with a polyalkylene ether glycol.

DETAILED DESCRIPTION

The mixture of aryl diisocyanate of use in the present invention comprises from about 65% to about 35% of $C_1$ to $C_{12}$ linear or branched alkyl-substituted 2,4-aryl diisocyanate and from about 35% to about 65% of $C_1$ to $C_{12}$ linear or branched alkyl-substituted 2,6-aryl diisocyanate. Preferably, the alkyl substituents are 65%-50% 2,4- to 35%-50% 2,6-. It is particularly preferred to have the isomeric mixture at 65% 2,4-isomer to 35% 2,6-isomer.

The glycols that are reacted with the aryl diisocyanates according to the present invention are a class of materials termed polyalkylene oxides. These compounds are typically the reaction product of 1,2-epoxide and tetrahydrofuran polymerizations, with the low melting or liquid polymers being the most useful for the preferred embodiment of this invention. Low molecular weight, alcohol-terminated polytetramethylene ether glycols, prepared commercially by the acid catalyzed ring opening of tetrahydrofuran are preferred. Also preferred are polyoxyethylenes and polyoxypropylenes for use in the compositions of this invention. These materials are commercially prepared by the alkali- or acid-catalyzed ring opening of the 1,2-epoxide precursor. Other alkylene oxide polymers useful herein are those prepared from 1,2-butylene oxide, styrene oxide, and aryl or alkenyl glycidal ethers.

The prepolymer urethanes useful in the compositions of the present invention are prepared by reacting a mixture of toluene-2,4-diisocyanate and/or toluene-2,6-diisocyanate with a polyether polyol (alcohol-terminated polyalkylene oxide) as taught in Nalepa, et al., the teachings of which are incorporated herein in toto by reference. In a preferred embodiment of the invention, the polyether polyol is a polytetramethylene ether glycol. It is also preferred that the prepolymer has a free —NCO content of 0.1 to 20% by weight, preferably 0.5 to 15% by weight, and most preferably 2-10% by weight.

While various substituted or unsubstituted phenylenediamines can be used herein, the preferred aromatic diamine of use in the present invention is an isomeric blend of 80% 3,5-di(methylthio)-2,4-diaminotoluene and 20% 3,5-di(methylthio)-2,6-diaminotoluene (DMTDA 80/20). This diamine is reacted with the prepolymer as a pure or substantially pure compound containing not more than about 5% by weight of impurities, such as the mono(methylthio)-2,4- and/or 2,6-diaminotoluenes that are typically formed as by-products in the synthesis of these di(methylthio)-diaminotoluenes. The amount of the isomeric blend employed is generally 0.8-1.2 equivalents, preferably 0.85-1.15 equivalents, per equivalent of the prepolymer.

As in the preparation of other cast polyurethane elastomers, the polyurethane-ureas of the present invention are prepared by adding a mixture of the prepolymer, the aromatic diamine, and any optional ingredients to a suitable mold, curing the reaction mixture (in the mold) to form a polyurethane-urea, and removing the polyurethane-urea from the mold. Curing temperatures of about 25°-150° C. are particularly suitable. Optional ingredients that may be employed include conventional additives, such as blowing agents, flame retardants, emulsifiers, pigments, dyes, mold release agents, foam stabilizers, fillers, etc. In a preferred embodiment of the invention, the reaction mixture is degassed prior to casting.

The polyurethane-ureas of the invention exhibit improved dynamic properties when compared to similar systems that have lower amounts of the 2,6-alkyl-substituted aryl diisocyanates. They show longer times-to-failure in the dynamic wheel test as well as having higher modulus and lower percent deformation in the large strain dynamics test. Accordingly, they are particularly attractive as elastomers for coatings, rollers and tires.

The following examples are given to illustrate the invention and are not intended as a limitation thereof. In each of the examples, the reaction mixtures were prepared by mixing the aromatic diamine with 140 g of the prepolymer to provide 0.95 equivalent of the aromatic diamine per equivalent of the prepolymer. The reaction mixtures were cast into molds at 100° C., demolded after about 30 minutes, and further postcured at 100° C. for 18 hours. The test pieces were aged for at least one week at 24° C. and 50% relative humidity prior to testing.

EXAMPLES

In Table I, the compositions are shown. In Table II, the results of the dynamic wheel testing are shown using the compositions of Table I.

In the following Examples, Mondur ® TD80, TD, and TDS represent toluenediisocyanate (TDI) products from Moba Chemical Corporation, Terathane ® T-1000 is a polytetramethylene ether glycol (molecular weight about 1000) available from E. I. du Pont, and Terathane ® T-2000 is a higher molecular weight version (molecular weight about 2000).

TABLE I

| | Synthesis and Reactivity Data | | | |
|---|---|---|---|---|
| EXAMPLE | 1 | 2 | 3 | 4 |
| TD80 (80/20 TDI) | 204 | 204 | — | — |
| TD (65/35 TDI) | — | — | 204 | — |
| TDS (2,4-TDI) | — | — | — | 204 |
| T-1000 | 436 | — | 436 | 436 |
| T-2000 | 161 | — | 161 | 161 |
| T-1000/T-2000 Blend[1] | — | 597 | — | — |
| polyol eq. W., avg. | 575 | 575 | 575 | 575 |
| % NCO, theory | 6.84 | 6.84 | 6.84 | 6.84 |
| % NCO, actual | 6.80 | 6.79 | 6.64 | 6.75 |
| Viscosity, cp[2] | 540 | 530 | 580 | 510 |
| Reactivity[3] | | | | |
| Pour Time | 1'20" | 1'20" | 50" | 2'20" |
| Gel Time | 1'55" | 1'55" | 1'20" | 3'15" |
| Firm Time | 2'50" | 2'40" | 2'25" | 4'30" |
| Polymer Appearance | Clear | Clear | Hazy | Clear |
| Reactivity[4] | | | | |
| Pour Time | 1'00" | 1'05" | 40" | 1'55" |
| Gel Time | 1'30" | 1'35" | 1'10" | 2'30" |
| Firm Time | 2'05" | 2'10" | 2'00" | 3'30" |
| Polymer Appearance | Clear | Clear | Hazy | Clear |

[1]Blend consisted of 436 g T-1000 and 161 g T-2000.
[2]At 80° C.
[3]At 80° C., with ETHACURE ®300 curative (DMTDA 80/20).
[4]At 80° C., with DMTDA (65/35).
Eq. Wt. of components:
TD-80: 87.1
T-1000: 495
T-2000: 1030

TABLE II

| | | | Dynamic Wheel Testing | | | |
|---|---|---|---|---|---|---|
| EXAMPLE | HARDNESS SHORE A.D | LOAD (Lbs.) | MOTOR CURRENT (Amps, Min.) | MOTOR CURRENT (Amps, Max.) | PEAK TEMP. (°C.) | TIME TO FAILURE (Minutes) |
| 1 | 95,47 | 280 | 3.7 | 6.0 | 153 | 34.6 |
| 2 | 95,48 | 280 | 3.4 | 6.3 | 152 | 33.3 |
| 3 | 94,47 | 280 | 3.0 | — | 113 | 60+ |
| | | 320 | 3.2 | 5.7 | 142 | 12.2 |
| 4 | 95,46 | 280 | 3.9 | 6.5 | 142 | 16.0 |
| 1 | 97,49 | 280 | 3.3 | 5.9 | 159 | 51.7 |
| 2 | 96,48 | 280 | 3.2 | — | 124 | 60+ |
| | | 320 | 3.6 | 6.3 | 157 | 5.4 |
| 3 | 97,49 | 280 | 3.0 | — | 106 | 60+ |
| | | 320 | 3.2 | 5.8 | 148 | 23.2 |
| | 97,49[1] | 320 | 3.0 | 6.3 | 145 | 35.4 |
| 4 | 95,46 | 280 | 3.2 | 6.2 | 154 | 20.4 |
| | | 320 | 3.2 | 6.5 | 147 | 16.1 |

[1]Second run starting at 320-lb. load.

PREPARATION OF PLUGS FOR WHEEL TESTER

Polymer samples for plug fabrication were prepared using a small scale (200 g) capacity glass reactor. The reactor had provisions for mechanical stirring, temperature monitoring, and connections to nitrogen and vacuum. Curative heated to 50° C. was added to degassed prepolymer heated to 80° C. and the mixture stirred for one minute. Following a second degassing, the material was poured into a plug mold. The mold was previously heated to 100° C. Parts were demolded after 30 minutes and further postcured 18 hours at 100° C. The parts were allowed to equilibrate at room temperature for at least one week prior to testing.

The plugs for the wheel tester have dimensions of 1.5" diameter × 1.5" length.

TESTING OF PLUGS—GENERAL PROCEDURE

Data was obtained on the wheel tester using the following conditions:
Speed: 2.0 mph
Load: 280 lbs.
Temperature: Ambient Start the machine and record plug surface temperature and motor current at 1-2 minute intervals (depending upon the expected life of the test) and at more frequent intervals (every 15 seconds) when the plug begins to fail. As the plug fails, the machine tends to vibrate and produce noise. A kill switch automatically terminates the run when the arm travels past a predetermined point of deflection due to softening/blowout of the plug. Plug surface temperature gives an indication of internal heat build-up in the part, whereas motor current gives an indication of rolling resistance.

For comparison purposes, plugs were also prepared from ETHACURE ® 300 curative and two commercial prepolymers-Adiprene ® L-300 prepolymer and Adiprene ® L-367 prepolymer. Adiprene L-300 is a reaction product of 1000 MW PTMEG polyol (e.g., Terathane T-1000) and 80/20 TDI (e.g., Mondur TD-80). The NCO content of the prepolymer used in this work was 4.20%. Adiprene L-367 prepolymer is similar to Adiprene L-300 but has higher NCO content. The Adiprene L-367 prepolymer used in this work had an NCO content of 6.27% Both prepolymers are available from Uniroyal Chemical Co., Inc.

What is claimed is:

1. A polyurethane composition comprising the reaction product of 3,5-di(methylthio)-2,6-diaminotoluene, 3,5-di(methylthio)-2,4-diaminotoluene, or mixtures thereof, with an isocyanate prepolymer produced by reacting an admixture of from about 65% to about 35% 2,4-toluene diisocyanate and from about 35% to about 65% 2,6-toluene diisocyanate with a polyoxyalkylene glycol said prepolymer having a free —NCO content of 0.1-20% by weight.

2. The polyurethane of claim 1 wherein the prepolymer has a free —NCO content of 0.5-15% by weight.

3. The polyurethane of claim 2 wherein the prepolymer has a free —NCO content of 2-10% by weight.

4. The polyurethane of claim 1 wherein a mixture of said diaminotoluenes is employed in an amount such as to provide 08–1.2 —NH$_2$ groups per free —NCO group.

5. The polyurethane of claim 4 wherein the —NH$_2$/—NCO ratio is 0.85–1.15.

6. The polyurethane of claim 1 which is prepared by reacting 0.8–1.2 equivalent proportions of said mixture of diaminotoluenes with one equivalent proportion of a toluenediisocyanate prepolymer having a free —NCO content of 2–10% by weight and obtained by reacting an admixture of from about 65% to about 35% 2,4-toluene diisocyanate and from about 35% to about 65% 2,6-toluene diisocyanate with a polytetramethylene ether glycol.

7. The polyurethane of claim 6 which is prepared by reacting 0.85–1.15 equivalent proportions of said mixture of diaminotoluenes with one equivalent proportion of the prepolymer.

8. A process which comprises a) casting into a mold a reaction mixture of 3,5-di(methylthio)-2,6-diaminotoluene and 3,5-di(methylthio)-2,4-diaminotoluene with an isocyanate terminated prepolymer obtained by reacting an admixture of about 65% to about 35% 2,4-toluene diisocyanate and from about 35% to about 65% 2,6-toluene diisocyanate with a polyoxyalkylene glycol having a free —NCO content of 2–10% by weight, b) curing the reaction mixture in the mold at a temperature of about 25°–150° C. to form a polyurethane, and c) removing the polyurethane from the mold.

9. The process of claim 8 wherein the reaction mixture comprises 0.85–1.15 equivalent proportions of said mixture of diaminotoluenes and one equivalent proportion of the prepolymer.

* * * * *